United States Patent
Wollner

[11] 3,765,204
[45] Oct. 16, 1973

[54] PRESSURE HEAD INDICATOR FOR MACHINE TOOLS

[75] Inventor: Josef Wollner, Penzendorf, Germany

[73] Assignee: Richard Bergner, Nurnberg, Germany

[22] Filed: May 5, 1971

[21] Appl. No.: 140,430

[30] Foreign Application Priority Data
May 8, 1970 Germany.................. P 20 22 539.2

[52] U.S. Cl.............................. 72/31, 72/4, 72/10, 72/38
[51] Int. Cl. ............................................ B21c 51/00
[58] Field of Search ..................... 72/3, 4, 5, 10, 26, 72/28, 31, 33, 38; 81/61–63; 408/6, 7

[56] References Cited
UNITED STATES PATENTS

| | | | |
|---|---|---|---|
| 3,241,402 | 3/1966 | Crowell et al. | 408/6 |
| 3,358,096 | 12/1967 | Wintriss | 200/81.6 |
| 3,568,229 | 3/1971 | Moore et al. | 10/155 A |
| 3,160,045 | 12/1964 | Newgard | 83/63 |
| 3,527,073 | 9/1970 | Wintriss | 72/4 |
| 3,070,143 | 12/1962 | Klinger | 72/5 |
| 3,373,584 | 3/1968 | Rundt et al. | 72/10 |

FOREIGN PATENTS OR APPLICATIONS

| | | | |
|---|---|---|---|
| 531,213 | 5/1972 | Great Britain | 72/28 |
| 1,905,183 | 8/1970 | Germany | 408/7 |

*Primary Examiner*—Charles W. Lanham
*Assistant Examiner*—M. J. Keenan
*Attorney*—Richards & Geier

[57] ABSTRACT

A machine tool including a pressure head indicator, forming part of the machine or part of the tool thereof. The indicator includes a body having two parallel blind bores, one connected to a source of compressed air and the other to a pressure detector, the two bores being connected by a third transverse bore having a constriction therein. Changes in pressure are detected depending whether the third bore is closed by a workpiece or by contact with another tool part. Alternatively, the third bore may be opened by breakage of the tool.

7 Claims, 7 Drawing Figures

PATENTED OCT 16 1973 3,765,204

INVENTOR:
Josef Wollner
BY:
Richards & Geier
ATTORNEYS

PRESSURE HEAD INDICATOR FOR MACHINE TOOLS

The present invention relates to a machine or a tool for the manufacture of objects with a pressure head indicator arranged in a machine or tool part for monitoring the manufacture or the machine or the tool and also relates to such indicators.

Pressure head indicators are known, which, as a subsequently attachable unit, are cylindrically formed and have a bore concentric to their central axis, and a bore extending radially from its circumference to this central bore. If compressed air is introduced into the central bore and the opposite end of the bore blanked off, then the compressed air escapes to the radial bore. This compressed air escaping to the radial bore can be used as control air for controlling indicating devices. These known pressure head indicators could not therefore, previously be used on machines or tools for the manufacture of objects of supervising manufacture or the machine or the tool, because they do not permit a normal, simple manufacturing run, or disturb it too much.

A drilling machine is known from U.S. Pat. No. 3,241,402 which has a guide bushing plate fitted with several guide bushings. Each guide bushing has a radial bore, which is in alignment with a corresponding bore of the plate, the bore of the plate being connected to a compressed air line.

This compressed air line has, before reaching the bore of the plate, a shunt line, which leads to a pressure operated electrical switch, which is operated by variations in air pressure in the compressed air line. This electrical switch has two switching positions and is so inserted into the circuit, that the drilling machine is switched off in one position of the switch and switched on in the other position. If there is a drill in the guide bushing which is turned at a specific speed of rotation in operation, then this drill practically forms a solid metal rod, which blanks off the radial bore of the guide bushing in such a way, that no compressed air can escape into the guide bushing. The compressed air available in the compressed air line, then operates the electrical switch so that the drilling machine remains in the switched-on condition. If the drill breaks off in service, then the radial bore of the guide bushing is opened up, so that compressed air from the compressed air line flows through the radial bore into the guide bushing and from there outwards. In the region of the electrical switch a pressure drop then occurs in the compressed air line, as a result of which the electrical switch goes into a position, in which the drilling machine is switched off. The two switching positions of the switch, that is, the operating condition and the stopped condition of the drilling machine, are indicated by a green and a red signal lamp. The pressure head indicator also serves to indicate the breakage of a drill. Also if the speed of rotation of the drill is too low, the drilling machine is switched off, because air can escape between the flutes from the radial bore of the guide bushing.

It is the purpose of the invention, in the case of machines or tolls for manufacturing objects, to arrange and form pressure head indicators completely on machine or tool parts in a space-saving and simple way so that on the one hand, the normal, simple manufacturing run is not disturbed and, on the other, a simple control of the necessary air lines is offered.

According to the invention there is provided a pressure head indicator for a machine tool for manufacturing objects, such indicator including a body forming part of the machine tools or the tool, a first blind bore in the body for connection to a source of fluid under pressure, a second blind bore in the body, spaced from the first blind bore, for connection to a pressure detector, and a third blind bore in the body connecting the first and second blind bores.

Preferably the first and second blind bores are parallel to each other, so that the air lines required connected to them can be led away from the pressure head indicator parallel to each other and at a slight distance from each other, therefore in a space-saving way.

In use the third blind bore can be blanked off by a tool or a workpiece. To reduce the consumption of compressed air in the pressure head indicator to a minimum, this third blind bore is preferably provided, between the first and second blind bores with a constriction. As a result of this constriction a throttle effect is achieved, which reduces the compressed air consumption to a minimum.

The invention also provides a material treating machine tool comprising means for feeding material to be treated, a source of fluid under pressure, a pressure detector, a pressure head indicator having a material contacting surface, a first blind bore in the indicator connected to the source of fluid under pressure, a second blind bore indicator spaced from the first blind bore and connected to the pressure detector, and a third blind bore in the indicator connecting the first and second blind bores and opening onto the material contacting surface, at a location to be contacted by the material and closed thereby.

Such a machine may be an upsetting machine, cutting machine, or the like, which are used for upsetting or cutting wire pieces, or the like, and wherein the pressure head indicator comprises a material stop located to be abutted by the strip material to close the third blind bore.

As soon as the wire during cutting or upsetting lies against the material stop, it blanks off the third bore so that the compressed air escapes through the second bore as control air. By means of this control air a counter, for example, can be activated, which counts the quantity of cut or upset wire pieces. If the wire piece is removed from the material stop, then the compressed air flows out of the third bore of the material stop.

In the case of rolling, milling, slitting machines or the like, which have feed tracks or runners for the workpieces and a blanking or masking piece to cover them, then the masking piece is formed as a pressure head indicator, with the third bore extending towards the feed tracks. Here again, when a workpiece covers the third bore the compressed air is led out of the second bore as control air. This control air can be used to activate a counter, giving a perfect method of production control.

The invention also provides a machine tool comprising a first tool part and a second tool part relatively movable with respect to one another, a source of fluid under pressure, a pressure detector, a first blind bore in one of the tool parts connected to a source of fluid under pressure, a second blind bore in the one tool part, spaced from the first blind bore and connected to the pressure detector, and a third blind bore in one tool part connecting the first and second blind bores therein.

In the case of bending tools, pressing tools, stamping tools or the like, with the first and second tool parts having cooperating surfaces, the third bore opening into the cooperating surface of the one tool part and extending in the direction of relative movement of the tool parts. If the one tool part is in its inoperative position, then the compressed air flows out of the third bore. As soon as the one tool part is moved into its working position, then the third bore is covered by the workpiece so that the compressed air flows out of one of the second bores as control air and can operate a counter. In the case of a cutting tool with a cutting punch, the cutting punch forms the first tool part, and the cooperating die the second tool part, whereby the third blind bore extends axially of the cutting punch in the direction of relative movement of the punch and die, to a location inwardly of the free end of the cutting punch whereby upon breakage of the punch the third blind bore is opened to atmosphere.

In order that the invention may more readily be understood, the following description is given, merely by way of example, reference being made to the accompanying drawings, in which.

In the various embodiments like parts have been indicated by like reference numerals.

Figure 1:
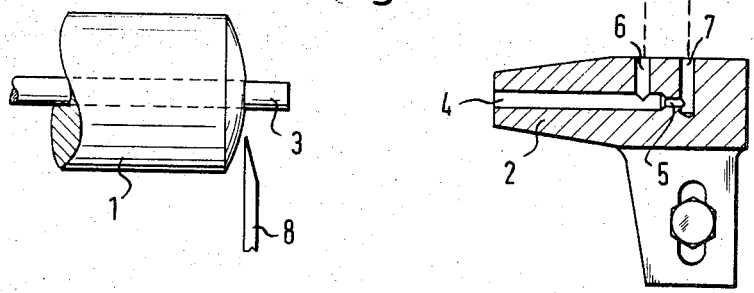
FIG. 1 is a side elevation, partly in section, of one embodiment of wire cutting machine, with a material stop formed as a pressure head indicator, according to the invention.
Figure 2:
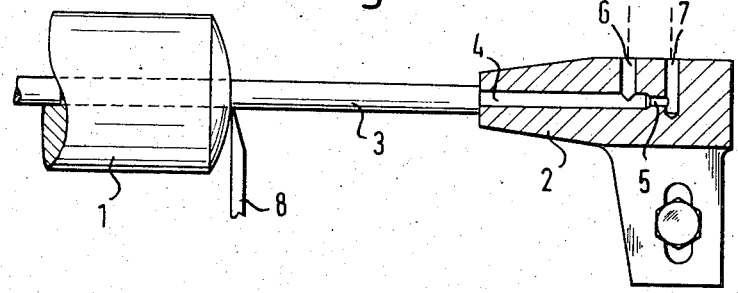
FIG. 2 is a similar view, but with the wire against the material stop.

The wire cutting machine shown in FIG. 1, has a wire feed including a wire guide 1 and a material stop 2 formed as a pressure head indicator. In the material stop 2, there are formed paralle spaced parallel first and second blind bores 7 and 6 and a third blind bore 4 axially aligned with the wire 3, and having a narrow section or constriction 5. The bore 4 is perpendicular to bores 6 and 7 and connects the latter via the constriction 5. Bore 7 is used for feeding compressed air from a source 30 and bore 6 for leading away control air to a pressure detector 31. If, as shown in FIG. 1 the wire is removed from the material stop 2, then the compressed air flows out of the bore 4. If, however, as shown in FIG. 2 the wire 3 has its front face abutting the material stop 2, then it covers bore 4 so that the compressed air escapes through the bore 6 and can be used as control air to operate the detector which may, for example, control a counter. With the aid of a cutter 8 the wire piece between the wire guide 1 and the material stop 2 is cut off.

Figures 3, 4:
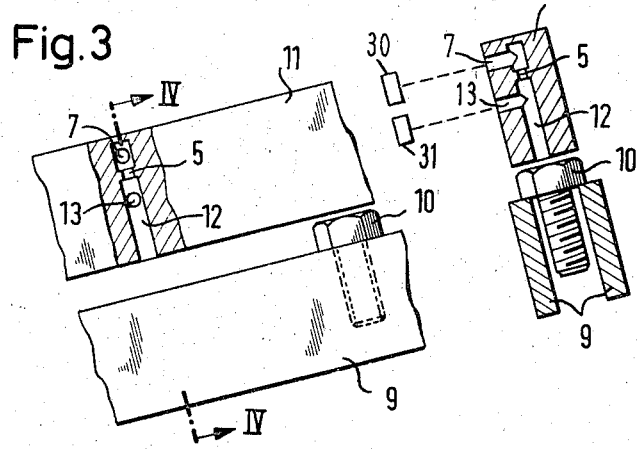
FIG. 3 is a side view, partly in section, of feed tracks and a masking piece of rolling, milling, slitting machines fitted with a pressure head indicator according to the invention.
FIG. 4 is a view along the line IV — IV of FIG. 3.

As shown in FIGS. 3 and 4, two feed tracks 9, associated with a rolling machine, milling machine, slitting machine or the like are arranged parallel to each other and, for example, are used for feeding screws. A masking piece 11 covers the screws 10 or the feed tracks 9. Masking piece 11 is formed as a pressure head indicator and has, for this purpose, a first and second bore 13 and 7 leading perpendicular to the third bore 12 having a constriction 5. As can be seen from FIG. 3, the compressed air flows out of bore 12. As soon as a screw 10 with its screw head underneath bore 12, this bore 12 is covered so that the compressed air flows basically out of bore 13 and can be used as control air for operating detector 31.

Figure 5:
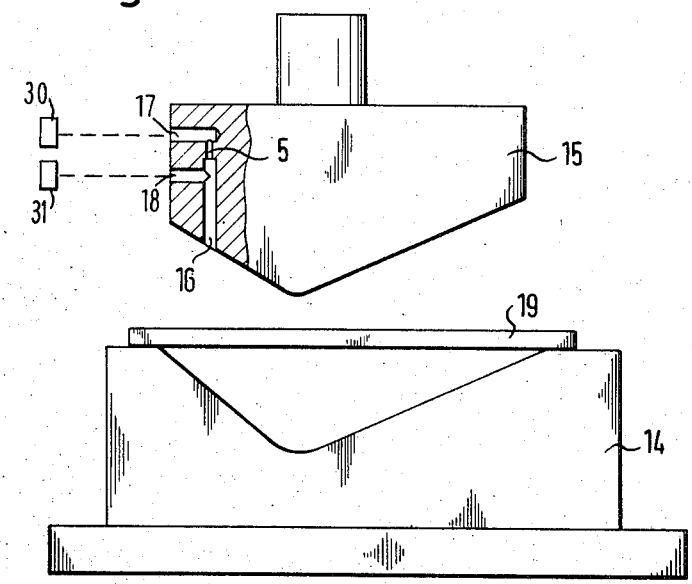
FIG. 5 is a side elevation, partly in section, of a pressing tool, the tool upper part of which is formed as a pressure head indicator, according to the invention.

In the case of the stamping tool represented in FIG. 5, which has a tool bottom part 14, and a tool top part 15, the tool top part 15 is formed as a pressure head indicator, and being movable vertically relative to the part 14. The tool top part 15 has a bore 16 extending vertically, parallel to the direction of pressing with a constriction 5 and two spaced apart bores 17 and 18 connected to bore 16 on either side of the constriction 5. Bore 17 is connected to compressed air source 30 and bore 18 to a detector 31 for control air. In the position of the tool top part 15 represented in FIG. 5, the compressed air flows out of bore 16. If, during the pressing procedure a workpiece 19 in the form of a plate is shaped by the tool top part 15, this workpiece 19 covers the third bore 16, so that the compressed air escapes out of bore 18 and can be used as control air for operating a counter.

Figure 6:
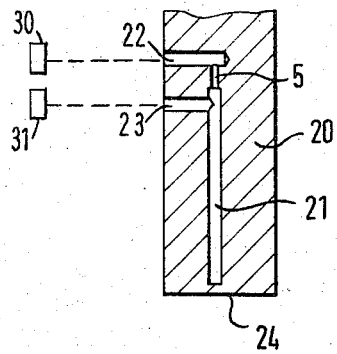
FIG. 6 is a view through a cutting punch formed as a pressure head indicator, according to the invention.
Figure 7:
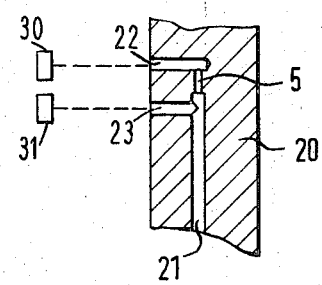
FIG. 7 is a view similar to FIG. 6, in which the bottom part of the cutting punch is broken away.

FIGS. 6 and 7 represent a cutting punch 20 of a cutting tool. This cutting punch 20 is formed as a pressure head indicator and has for this purpose a bore 21 running in the direction of cutting with a narrow section 5 and two bores 22 and 23 leading perpendicular to bore 21 and joined by constriction 5 thereof. Again bore 22 is used for feeding compressed air from source 30 and bore 23 for leading off control air. Bore 21 is closed at its bottom end and almost reaches to the working surface 24.

In accordance with FIG. 6, control air flows out of bore 23 during the operation of the cutting punch 20, so that the person looking after the cutting tool can always ascertain that the cutting punch 20 is serviceable.

If, however, the bottom edge of the cutting punch 20 breaks off during heavy stressing, then bore 21 is opened to atmosphere at its bottom end, so that compressed air can flow out at this position. As a result the pressure in bore 23 now drops, and this is sensed by detaching device 31 which will indicate to the person looking after the cutting tool that a breakage has occurred on cutting punch 20 and that cutting punch 20 must be changed.

In the embodiments which have been described and illustrated, the pressure head indicator formed by the machine or tool parts, is made as one piece. Naturally, it is also possible to manufacture the part of the machine or tool part which forms the pressure head indicator separately and fit it subsequently in or on the corresponding machine or tool part.

What I claim is:

1. In a machine or a tool for manufacturing objects and having a pressure detector and a pressure head indicator comprising a body forming a part of the machine or tool and having a first blind bore for connection to a source of fluid under pressure, a second blind bore extending parallel to and spaced from the first blind bore for connection to said pressure detector, and a third blind bore extending perpendicularly to and connecting the first and second blind bores at their inner ends, the outer end of the third blind bore being adapted to be closed by a tool or a workpiece to produce a pressure in the second blind bore for actuating said pressure detector.

2. A machine tool as claimed in claim 1, further comprising means defining a constriction in said third blind bore between said first and second blind bores.

3. A pressure head indicator in accordance with claim 1 for a material treating machine having means feeding the material to be treated, the pressure head indicator having a material contacting surface, said third blind bore opening onto said surface at a location effective to be contacted by said material and to be closed thereby.

4. A material treating machine tool as claimed in claim 3, wherein said machine tool is a strip material treating machine tool, and said pressure head indicator comprises a material stop located to be abutted by said strip material to close said third blind bore.

5. A material treating machine tool as claimed in claim 3, wherein said means for feeding material includes a workpiece feed track, and wherein said pressure head indicator comprises a masking piece positioned whereby said material contacting surface is contacted by workpieces on said feed track effective to close said third blind bore.

6. A machine tool according to claim 1, comprising a cutting punch having a free end, and a cooperating die, wherein said third blind bore extends axially of said cutting punch in the direction of relative movement of said punch and die, to a location inwardly of said free end, whereby upon breakage of said punch said third blind bore is opened to atmosphere.

7. A machine tool according to claim 1, further comprising means defining a constriction in said third blind bore between said first and second blind bores.

* * * * *